United States Patent
Karkhanis et al.

(10) Patent No.: US 9,483,271 B2
(45) Date of Patent: Nov. 1, 2016

(54) COMPRESSED INDIRECT PREDICTION CACHES

(71) Applicant: International Business Machines Corporation, Armonk, NY (US)

(72) Inventors: Tejas Karkhanis, White Plains, NY (US); David S. Levitan, Austin, TX (US); Jose E. Moreira, Irvington, NY (US); Mauricio J. Serrano, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 14/145,039

(22) Filed: Dec. 31, 2013

(65) Prior Publication Data

US 2015/0186145 A1    Jul. 2, 2015

(51) Int. Cl.
  *G06F 9/38* (2006.01)
  *G06F 9/32* (2006.01)
  *G06F 9/30* (2006.01)

(52) U.S. Cl.
  CPC ............ *G06F 9/3806* (2013.01); *G06F 9/322* (2013.01)

(58) Field of Classification Search
  None
  See application file for complete search history.

(56) References Cited

U.S. PATENT DOCUMENTS

| | | | |
|---|---|---|---|
| 5,564,118 A | 10/1996 | Steely, Jr. et al. | |
| 5,687,360 A | 11/1997 | Chang | |
| 5,875,325 A | 2/1999 | Talcott | |
| 6,275,927 B2 | 8/2001 | Roberts | |
| 6,438,673 B1 | 8/2002 | Jourdan et al. | |
| 6,766,443 B2 | 7/2004 | Sinharoy | |
| 6,938,151 B2 | 8/2005 | Bananno et al. | |
| 7,069,426 B1 | 6/2006 | Hummel | |
| 7,752,425 B2 | 7/2010 | Williams et al. | |
| 7,797,521 B2 | 9/2010 | Eickemeyer et al. | |
| 7,840,786 B2 | 11/2010 | Suggs | |
| 2005/0172277 A1* | 8/2005 | Chheda | G06F 9/3846 717/151 |
| 2006/0242393 A1* | 10/2006 | Park | G06F 9/30061 712/240 |
| 2008/0288760 A1 | 11/2008 | Park et al. | |
| 2009/0177875 A1* | 7/2009 | Moyer | G06F 9/3806 712/238 |

OTHER PUBLICATIONS

R.J. Eickenmeyer et al.; "Improving Instruction Cache Branch Prediction With Target Addresses," IPCOM000105409D;IBMTDB;v36,n7;pp. 497-498;Jul. 1, 1993.
Anonymous, "Method and System for Non-branch History Based Prediction Mechanism for Predicting Target Address for a Multiple-Target Branch Instruction," IPCOM/000196682; Jun. 11, 2010.

* cited by examiner

*Primary Examiner* — Scott Sun
(74) *Attorney, Agent, or Firm* — Mercedes L. Hobson; Michael J. Chang, LLC

(57) ABSTRACT

Provided herein is a compressed cache design to predict indirect branches in a microprocessor based on the characteristics of the addresses of the branch instructions. In one aspect, a method for predicting a branch target T in a microprocessor includes the following steps. A compressed count cache table (CTABLE) of branch targets indexed using a function combining a branch address and a branch history vector for each of the targets is maintained, wherein entries in the CTABLE contain only low-order bits of each of the targets in combination with an index bit(s) I. A given one of the entries is obtained related to a given one of the branch targets and it is determined from the index bits I whether A) high-order bits of the target are equal to the branch address, or B) the high-order bits of the target are contained in an auxiliary cache table (HTABLE).

20 Claims, 4 Drawing Sheets

Replacement of entries in HTABLE/CTABLE:

Replacement of entries in HTABLE/CTABLE:

If the number of entries is small (reduces access time):
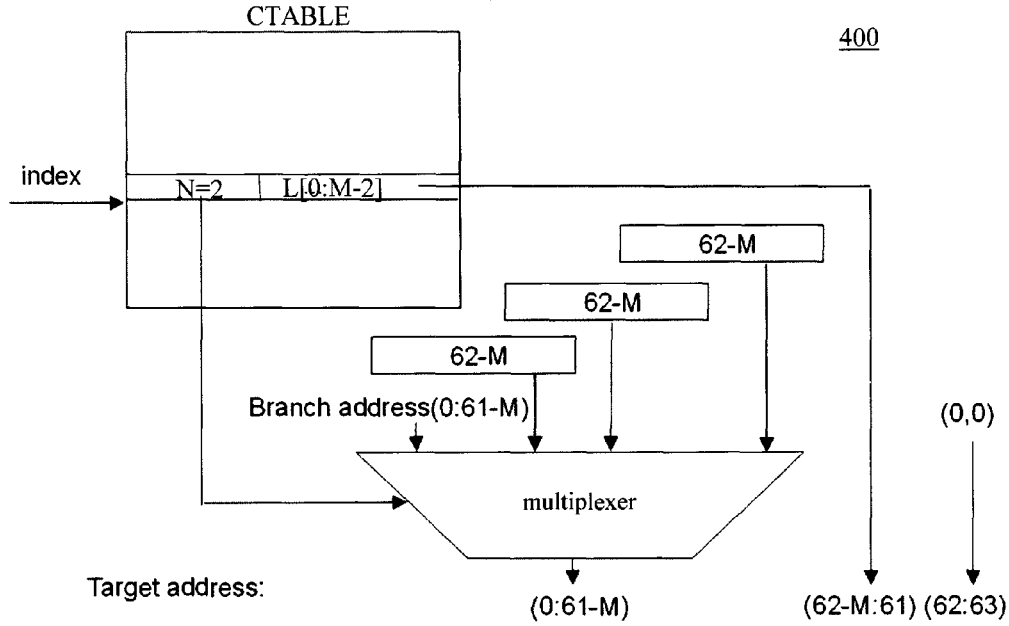
FIG. 4    N=2 ∥ L[0:M-2]
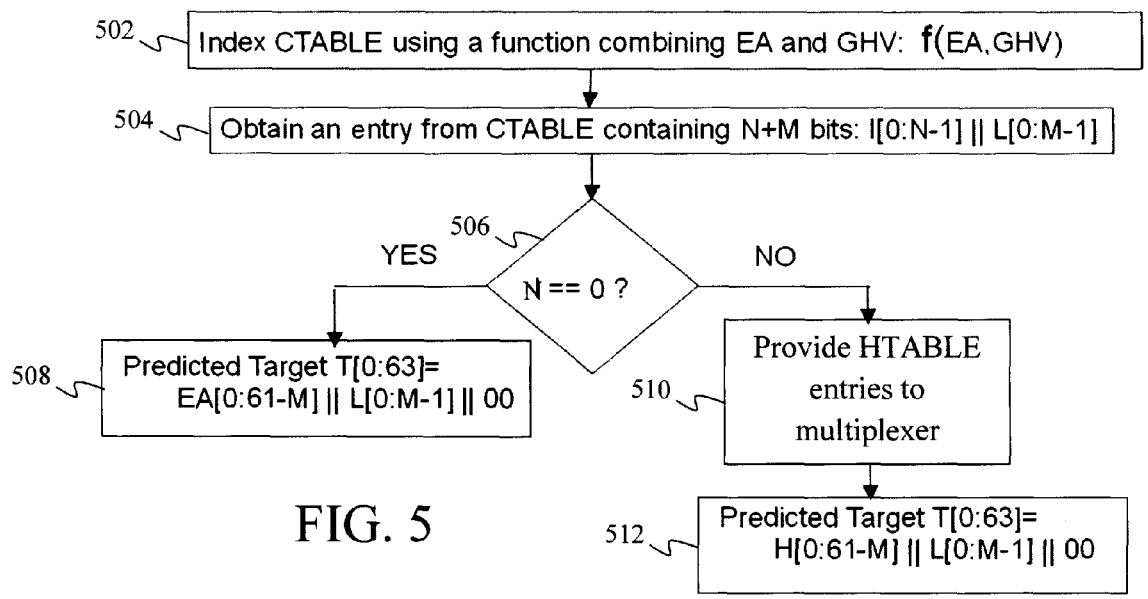
FIG. 5

COMPRESSED INDIRECT PREDICTION CACHES

FIELD OF THE INVENTION

The present invention relates to indirect branch prediction and more particularly, to a compressed cache design to predict indirect branches in a microprocessor based on the characteristics of the addresses of the branch instructions.

BACKGROUND OF THE INVENTION

Indirect branch prediction gives significant performance improvements to many programs. Indirect branch prediction utilizes tables which are also referred to as count caches since they are used to predict "branch to count instruction," a form of indirect branch. For example, two tables storing information for indirect branch prediction can be implemented: a) a local count cache indexed by instruction address storing predicted targets, b) a global count cache indexed by a combination of instruction address and global history vector storing predicted targets, and c) a selector used to decide which of the two tables (local or global) will provide the indirect branch prediction target. The idea for having two tables is that a) the local table is used for relatively easy to predict branches—by predicting that the next target of a particular branch will be the same as the previous target of the branch, b) the global table is used to predict relatively difficult to predict branches—by predicting the next target based on a correlation of the branch address and the path taken (branch history vector), and c) the selector will decide which of the two strategies (local or global) applies better for a particular indirect branch.

The amount of information stored in these tables is however very significant, constraining the number of entries that can be put in these tables, because the full 62-bit target needs to be stored (the two low-order bits are always zero). Thus, the amount of storage for these tables is very significant, on the order of 32 Kbits for a table containing 512 entries. For comparison, direct branch prediction using a two-bit confidence counter and 16K entries will consume a similar amount of space.

Therefore, techniques for reducing the storage budget associated with indirect branch prediction would be desirable.

SUMMARY OF THE INVENTION

The present invention provides a compressed cache design to predict indirect branches in a microprocessor based on the characteristics of the addresses of the branch instructions. In one aspect of the invention, a method for predicting a branch target T in a microprocessor is provided. The method includes the following steps. A compressed count cache table (CTABLE) of branch targets indexed using a function combining a branch address and a branch history vector for each of the branch targets is maintained, wherein entries in the CTABLE contain only low-order bits of each of the branch targets in combination with one or more index bits I. A given one of the entries is obtained from the CTABLE related to a given one of the branch targets. It is determined from the index bits I in the given entry whether A) high-order bits of the given branch target are equal to the branch address, or B) the high-order bits of the given branch target are contained in an auxiliary cache table (HTABLE). When A applies, the branch target T is predicted using only the low-order bits of the given branch target, or when B applies, the high-order bits of the given branch target are accessed via the HTABLE and the branch target T is predicted using one or more of the low-order bits of the given branch target and the high-order bits of the given branch target.

A more complete understanding of the present invention, as well as further features and advantages of the present invention, will be obtained by reference to the following detailed description and drawings.

BRIEF DESCRIPTION OF THE DRAWINGS

FIG. 4 is a diagram illustrating an exemplary alternative embodiment of the present compressed count cache system which may be employed for indirect branch prediction when the number table entries is small according to an embodiment of the present invention;

FIG. 5 is a diagram illustrating an exemplary methodology for indirect branch prediction using the compressed count cache system of FIG. 4 according to an embodiment of the present invention;

DETAILED DESCRIPTION OF PREFERRED EMBODIMENTS

As provided above, the amount of information stored in local and global count cache tables for indirect branch prediction can be significant, thus limiting the number of entries that can be put in the tables. However, it has been discovered that in practice, it is not necessary to store the full 62-bit target, since many difficult to predict indirect branches jump relatively close to the original branch address, for example: a) switch statements, b) virtual function calls, and c) virtual table calls. Also, for most easy-to-predict branches, there are typically not that many different high-order bits of the targets, since the bits are usually contained in a shared-library stored at some particular memory segment. In other words, the high-order bits typically exhibit low-entropy, and thus can be captured in a compressed scheme.

The present techniques exploit this notion by selectively reducing the number of bits for both local and global caches, thus reducing the storage budget. Namely, according to the present techniques, the count caches (local and global) are replaced with a compressed design, which stores only the low-order bits of the target and uses an indirect direction scheme for the high-order bits. The present techniques exploit the above-described notions that most of the time the high-order bits of the target are the same as the low-order bits, or that the number of patterns for the high-order bits are relatively few. Thus, the present compressed cache design replaces the high-order bits with relatively few index bits which indicate that either a) the high-order bits of the target are the same as the branch address, or b) a small auxiliary cache contains the high-order bits. The present compressed cache design produces similar prediction rate as the original cache design, but with a significantly reduced storage budget.

Figure 1:
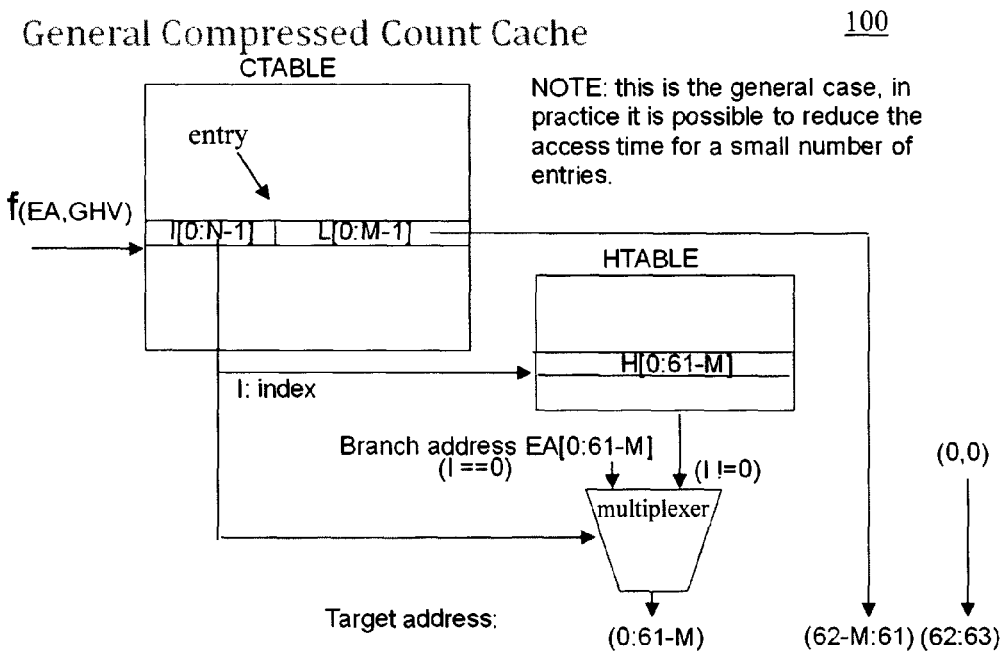
FIG. 1 is a diagram illustrating an exemplary system for indirect branch prediction using the present compressed count cache (CTABLE) and auxiliary cache (HTABLE) for high-order bits according to an embodiment of the present invention.

FIG. 1 is a diagram illustrating an exemplary system 100 for indirect branch prediction using the present compressed count cache. By comparison with scenarios which employ both local and global count caches, in the example shown illustrated in FIG. 1, there is only one compressed count cache table (CTABLE) and a smaller auxiliary cache (HTABLE) for the high-order bits.

Figure 2:
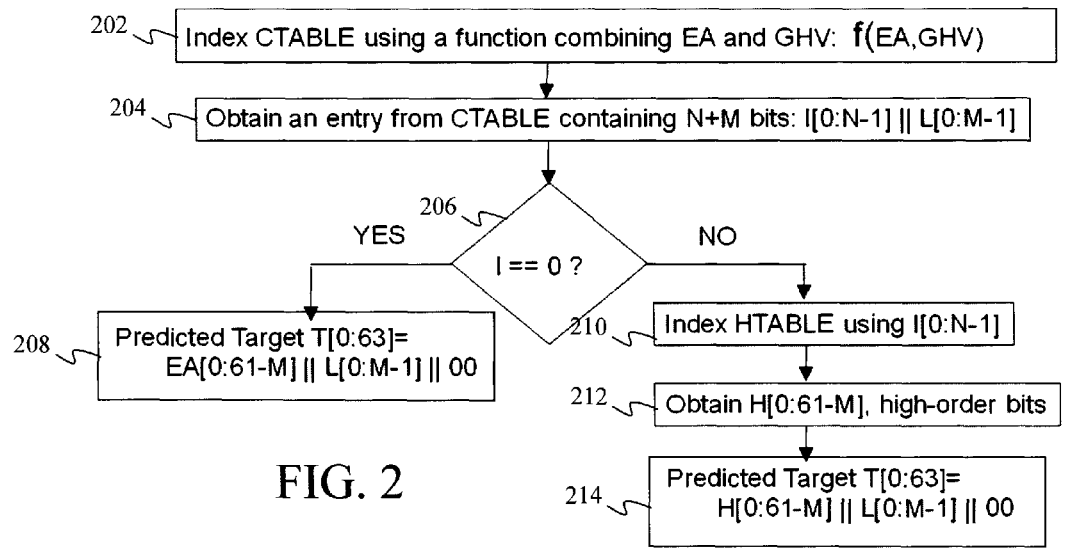
FIG. 2 is a diagram illustrating an exemplary methodology for indirect branch prediction using the present compressed count cache system according to an embodiment of the present invention.

Use of system 100 for predicting a branch target T in a microprocessor using the present compressed cache design is described by way of reference to methodology 200 illustrated in FIG. 2. In step 202, the compressed count cache table (CTABLE) is indexed using a function combining the branch address (also referred to herein as the effective address (EA)) and a branch history vector (GHV):
f(EA,GHV).
Given a 62-bit target address, the Effective Address (EA) of an indirect branch instruction is assumed herein to be EA[0:63]. As described above, a branch history vector (GHV) is used for the global count cache indexing. Step 202 is shown illustrated schematically in FIG. 1 where the entries to the compressed count cache table (CTABLE) are being indexed as a function of EA and GHV. Other forms of indexing the CTABLE are, however, possible such as based on just the effective address, or other combinations.

The entries in the compressed count cache table (CTABLE) contain only the low-order bits of the branch target T. The high-order bits of the target (present in conventional caching schemes) are in this case replaced by a few (e.g., 0-3) index bits. The index bits indicate that either a) the high-order bits of the target are the same as the branch address, or b) that a small auxiliary cache (HTABLE) contains the high-order bits.

Specifically, as per step 204, when an entry is obtained from the compressed count cache table (CTABLE), the entry will contain N+M bits, i.e., the index bits I[0:N−1] and/or the low-order bits of the target L[0:M−1]. See FIG. 1, wherein an entry to the compressed count cache table (CTABLE) includes the index bits and the low-order bits. As will be described in detail below, the index bits correspond to entries in the high-order bit auxiliary cache (HTABLE). Use of the few index bits for the high-order bits (rather than a global cache) greatly reduces the storage budget for the compressed count cache table (CTABLE).

In step 206, a determination is made as to whether the index bits I[0:N−1]=0, or not. If I[0:N−1]=0, then it is assumed that the high-order bits of the target are the same as the branch address and there is no corresponding entry in the high-order bit auxiliary cache (HTABLE). Accordingly, as per step 208, the predicted branch target T is based on the low-order bits of the entry. For instance, the high-order bits of the target can be the same as the branch address and thus the branch target T in this case might be the same as the branch address. See, for example, FIG. 1 which illustrates step 208 schematically by showing how the low-order bits are used in predicting the target address.

On the other hand, if it is determined (in step 206) that I[0:N−1]≠0, then in step 210 the high-order bit auxiliary cache (HTABLE) is indexed using the index bits I[0:N−1], and as per step 212, the high-order bits of the target (H[0:61−M]) are obtained. See FIG. 1 which illustrates schematically how the index bits I[0:N−1] are used to select high-order bits from the auxiliary cache (HTABLE).

In step 214, the high-order bits obtained in step 212 are used to determine the predicted branch target T. As shown in FIG. 1, a multiplexer can be used to select the correct output from the multiple inputs. As is known in the art, a multiplexer (also commonly referred to as a data selector) is a circuit that selects one of multiple input signals to send to output.

Figure 3:
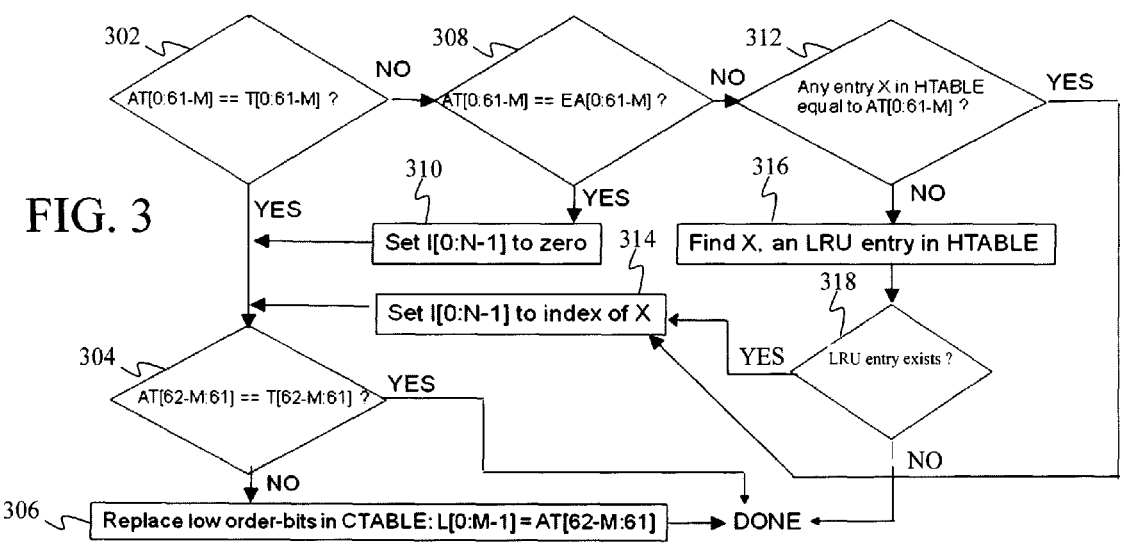
FIG. 3 is a diagram illustrating an exemplary methodology for replacing entries in the compressed count cache table (CTABLE) and the auxiliary cache (HTABLE) when a predicted branch target T is incorrect according to an embodiment of the present invention.

In the case where the predicted branch target T predicted by methodology 100 is incorrect, entries in the compressed count cache table (CTABLE) and the auxiliary cache (HTABLE) can be replaced in accordance with exemplary methodology 300 illustrated in FIG. 3. Namely, if the predicted branch target T is wrong (i.e., the predicted branch target T is different from an actual target (AT)), in step 302 a determination is made as to whether the high-order bits of the AT match the high-order bits of the predicted T. If the high-order bits of the AT match the high-order bits of the predicted T, then a determination is made in step 304 as to whether the low-order bits of the AT match the low-order bits of the predicted T. If the low-order bits of the AT match the low-order bits of the predicted T, then the process is complete and no updates to the cache tables are made. However, if it is determined in step 302 that the low-order bits of the AT do not match the low-order bits of the predicted T, then as per step 306 the low-order bits in the CTABLE (L[0:M−1]) are replaced with the low-order bits of the AT (AT[62−M:61]).

If, on the other hand, in step 302 it is determined that the high-order bits of the AT do not match the high-order bits of the predicted T, then as per step 308 another determination is made as to whether the high-order bits of the AT match the high-order bits of the effective address (EA) (i.e., the branch address). If it is determined in step 308 that the high-order bits of the AT match the high-order bits of the EA, then as per step 310 the index bits in the entry are set to 0 in only the compressed count cache table (CTABLE). This will indicate that the high-order bits for the entry are the same as the low-order bits. However, verification of the low-order bits then needs to be performed. The process for verifying whether the low-order bits of the AT match the low-order bits of the predicted T, as per step 304, was described above.

If, on the other hand, in step 308 it is determined that the high-order bits of the AT do not match the high-order bits of the EA, then as per step 312 another determination is made as to whether any entry (i.e., entry X) in the auxiliary cache (HTABLE) has the same high-order bits as the AT. If an entry (e.g., entry X) in the auxiliary cache (HTABLE) is found that has matching high-order bits with the AT, then as per step 314 the index bits of the entry are set to those of the entry X in only the compressed count cache table (CTABLE). However, optionally, the least recently used (LRU) replacement bits in the auxiliary cache (HTABLE) (see below) can be updated accordingly to the use of entry X, if so desired. Verification of the low-order bits is then performed. The process for verifying whether the low-order bits of the AT match the low-order bits of the predicted T, as per step 304, was described above.

On the other hand, if in step 312 it is determined that there is no entry in the auxiliary cache (HTABLE) with matching high-order bits to the AT, then as per step 316 a least recently used (LRU) entry X is found in the auxiliary cache (HTABLE), if such an entry exists. Other replacement policies can also be employed, similar to replacement policies found in commercial cache systems. For example, cache lines may have age bits (MRU, LRU, etc.) to indicate that the entry is used. If an entry becomes less used, then it could be a candidate for replacement.

If it is determined in step 318 that the LRU entry X in the auxiliary cache (HTABLE) exists, then as per step 314 the index bits of the entry are set to those of the entry X in the compressed count cache table (CTABLE). The entry X information in the auxiliary cache (HTABLE) is replaced to contain the low order bits of the branch target. Verification of the low-order bits is then performed. The process for verifying whether the low-order bits of the AT match the low-order bits of the predicted T, as per step 304, was described above.

FIGS. 1 and 2, described above, present the general case of indirect branch prediction using a compressed cache according to the present techniques. While the storage budget is greatly reduced in that case, extra access time is needed to access the auxiliary cache (HTABLE) and multiplexing the output. It is however possible in instances where there are a small number of entries to reduce the access time. Namely, when there are a small number of entries, the auxiliary cache (HTABLE) entries can be accessed in parallel by putting the output of each entry into a multiplexer, which selects the correct entry. See, for example, FIGS. 4 and 5.

Namely, FIG. 4 is a diagram illustrating an exemplary system 400 which is an alternative embodiment of the present compressed count cache system which may be employed for indirect branch prediction when the number of table entries is small (i.e., small meaning that a multiplexer can access all of the entries in parallel). By comparison with the system 100 (of FIG. 1), while system 400 uses a compressed count cache table (CTABLE), system 400 does not maintain an indexed auxiliary cache (HTABLE), but rather the HTABLE entries are accessed in parallel by putting the output of each entry to a multiplexer—which then selects the correct entry.

Use of system 400 for predicting a branch target T in a microprocessor using the present compressed cache design is described by way of reference to methodology 500 illustrated in FIG. 5. As above, in step 502 the compressed count cache table (CTABLE) is indexed using a function combining the effective address (EA) and a branch history vector (GHV), i.e., f(EA,GHV).

As with system 100 above, the entries in the compressed count cache table (CTABLE) contain only the low-order bits of the branch target T, whereas the high-order bits of the target are replaced in this case by 2 index bits. The index bits indicate that either a) the high-order bits of the target are the same as the branch address, or b) that a small auxiliary cache (HTABLE) contains the high-order bits.

Specifically, as per step 504, when an entry is obtained from the compressed count cache table (CTABLE), the entry will contain N+M bits, i.e., the index bits I[0:N−1] and/or the low-order bits of the target L[0:M−1]. See FIG. 4, wherein an entry to the compressed count cache table (CTABLE) includes the index bits and the low-order bits.

In step 506, a determination is made as to whether I[0:N−1]=0, or not. If I[0:N−1]=0, then it is assumed that the high-order bits of the target are the same as the branch address, and as per step 508, the predicted branch target T is determined based on the low-order bits of the target. For instance, the branch target T in this case might be the same as the branch address. See, for example, FIG. 4 which illustrates step 508 schematically by showing how the low-order bit is used in predicting the target address.

On the other hand, if it is determined (in step 506) that I[0:N−1]≠0, then in step 510 the HTABLE entries are accessed by a multiplexer which selects the correct high-order bit target entry. See FIG. 4 which illustrates schematically how the HTABLE entries are fed into a multiplexer. In step 512, the high-order bits obtained in step 510 are used to determine the predicted branch target T.

Figure 6:
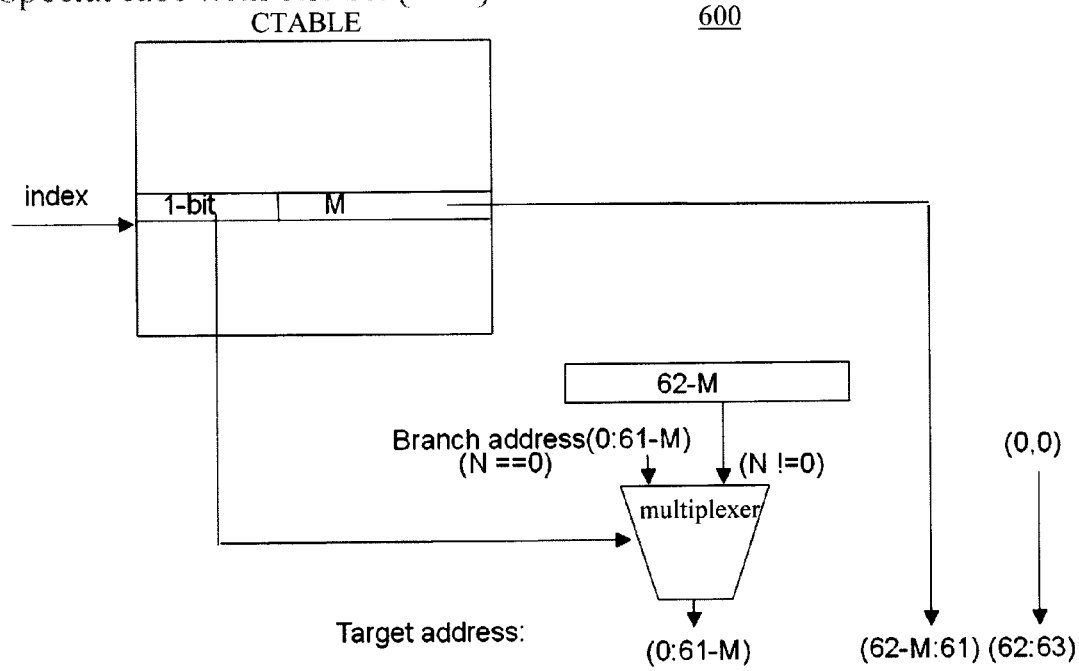
FIG. 6 is a diagram illustrating another exemplary alternative embodiment of the present compressed count cache system which may be employed for indirect branch prediction when the number table entries is small according to an embodiment of the present invention.

Yet another alternative embodiment of the present compressed count cache system which may be employed for indirect branch prediction when the number of table entries is small is shown in FIG. 6. As shown in FIG. 6, system 600 is similar to, and functions in the same manner as system 400 (i.e., wherein rather than indexing the high-order bits of the target, the HTABLE entries are accessed in parallel by a multiplexer), except that in system 600 only a single index bit is used. As shown in FIG. 6, this reduces the number of entries to be processed, thus further reducing the access time.

Figure 7:
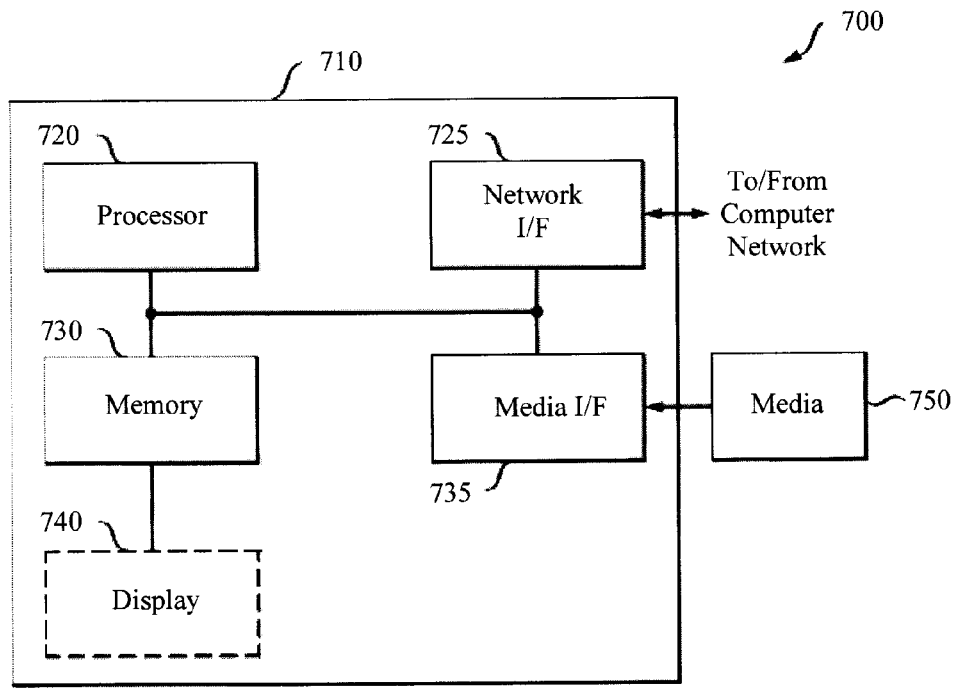
FIG. 7 is a diagram illustrating an exemplary apparatus for performing one or more of the methodologies presented herein according to an embodiment of the present invention.

Turning now to FIG. 7, a block diagram is shown of an apparatus 700 for implementing one or more of the methodologies presented herein. By way of example only, apparatus 700 can be configured to implement one or more of the steps of methodology 200 of FIG. 2 for indirect branch prediction using the present compressed count cache system, methodology 300 of FIG. 3 for replacing entries in the compressed count cache table (CTABLE) and the auxiliary cache (HTABLE) when a predicted branch target T is incorrect and/or methodology 500 of FIG. 5 for indirect branch prediction using the present compressed count cache system when the number of table entries is small.

Apparatus 700 comprises a computer system 710 and removable media 750. Computer system 710 comprises a processor device 720, a network interface 725, a memory 730, a media interface 735 and an optional display 740. Network interface 725 allows computer system 710 to connect to a network, while media interface 735 allows computer system 710 to interact with media, such as a hard drive or removable media 750.

As is known in the art, the methods and apparatus discussed herein may be distributed as an article of manufacture that itself comprises a machine-readable medium containing one or more programs which when executed implement embodiments of the present invention. For instance, when apparatus 700 is configured to implement one or more of the steps of methodology 200 the machine-readable medium may contain a program configured to maintain a compressed count cache table (CTABLE) of branch targets indexed using a function combining a branch address and a branch history vector for each of the branch targets, wherein entries in the CTABLE contain only low-order bits of each of the branch targets in combination with one or more index bits I; obtain a given one of the entries from the CTABLE related to a given one of the branch targets; determine from the index bits I in the given entry whether A) high-order bits of the given branch target are equal to the branch address, or B) the high-order bits of the given branch target are contained in an auxiliary cache table (HTABLE); and when A applies: predict the branch target T using only the low-order bits of the given branch target, or when B applies: access the high-order bits of the given branch target via the HTABLE and predict the branch target T using one or more of the low-order bits of the given branch target and the high-order bits of the given branch target.

The machine-readable medium may be a recordable medium (e.g., floppy disks, hard drive, optical disks such as removable media 750, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 720 can be configured to implement the methods, steps, and functions disclosed herein. The memory 730 could be distributed or local and the processor device 720 could be distributed or singular. The memory 730 could be implemented as an electrical, magnetic or optical memory, or any combination of these or other types of storage devices. Moreover, the term "memory" should be construed broadly enough to encompass any information able to be read from, or written to, an address in the addressable space accessed by processor device 720. With this definition, information on a network, accessible through network interface 725, is still within memory 730 because the processor device 720 can retrieve the information from the network. It should be noted that each distributed processor that makes up processor device 720 generally contains its own addressable memory space. It should also be noted that some or all of computer system 710 can be incorporated into an application-specific or general-use integrated circuit.

Optional display 740 is any type of display suitable for interacting with a human user of apparatus 700. Generally, display 740 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for predicting a branch target T in a microprocessor, the method which is performed by a processor device comprises the steps of:
    maintaining a compressed count cache table (CTABLE) of branch targets indexed using a function combining a branch address and a branch history vector for each of the branch targets, wherein entries in the CTABLE contain only low-order bits of each of the branch targets in combination with one or more index bits I;
    obtaining a given one of the entries from the CTABLE related to a given one of the branch targets;
    determining from the index bits I in the given entry whether A) high-order bits of the given branch target are equal to the branch address, or B) the high-order bits of the given branch target are contained in an auxiliary cache table (HTABLE); and
    when A applies: predicting the branch target T using only the low-order bits of the given branch target, or when B applies: accessing the high-order bits of the given branch target via the HTABLE and predicting the branch target T using one or more of the low-order bits of the given branch target and the high-order bits of the given branch target.

2. The method of claim 1, wherein the HTABLE contains the high-order bits of the branch targets indexed using the index bits I.

3. The method of claim 2, further comprising the step of:
    obtaining an entry from the HTABLE containing the high-order bit for the given branch target.

4. The method of claim 1, wherein A applies when I=0, and B applies when I≠0.

5. The method of claim 1, further comprising the step of:
    inputting entries from the HTABLE into a multiplexer.

6. The method of claim 1, wherein the branch target T predicted is different from an actual target, the method further comprising the steps of:
    determining whether high-order bits of the actual target equal high-order bits of the branch target T predicted; and
    determining whether low-order bits of the actual target equal low-order bits of the branch target T predicted.

7. The method of claim 6, wherein the high-order bits of the actual target do not equal the high-order bits of the branch target T predicted, the method further comprising the steps of:
    determining whether the high-order bits of the actual target equal high-order bits of the branch address; and
    setting the index bits I in the given entry to 0 if the high-order bits of the actual target equal the high-order bits of the branch address.

8. The method of claim 7, wherein the high-order bits of the actual target do not equal the high-order bits of the branch address, the method further comprising the steps of:
    determining if high-order bits of any given entry X in the HTABLE equal the high-order bits of the actual target; and
    setting the index bits I in the given entry to an index of the given entry X if the high-order bits of the given entry X in the HTABLE equal the high-order bits of the actual target.

9. The method of claim 6, wherein the low-order bits of the actual target do not equal the low-order bits of the branch target T predicted, the method further comprising the step of:
    replacing the low-order bits of the given branch target in the CTABLE with the low-order bits of the actual target.

10. The method of claim 1, wherein the one or more index bits I comprise 2-bits.

11. The method of claim 1, wherein the one or more index bits I comprise a single bit.

12. An apparatus for predicting a branch target T in a microprocessor, the apparatus comprising:
    a memory; and
    at least one processor device, coupled to the memory, operative to:
        maintain a compressed count cache table (CTABLE) of branch targets indexed using a function combining a branch address and a branch history vector for each of the branch targets, wherein entries in the CTABLE contain only low-order bits of each of the branch targets in combination with one or more index bits I;
        obtain a given one of the entries from the CTABLE related to a given one of the branch targets;
        determine from the index bits I in the given entry whether A) high-order bits of the given branch target are equal to the branch address, or B) the high-order bits of the given branch target are contained in an auxiliary cache table (HTABLE); and
        when A applies: predict the branch target T using only the low-order bits of the given branch target, or when B applies: access the high-order bits of the given branch target via the HTABLE and predict the branch target T using one or more of the low-order bits of the given branch target and the high-order bits of the given branch target.

13. The apparatus of claim 12, wherein the HTABLE contains the high-order bits of the branch targets indexed using the index bits I.

14. The apparatus of claim 13, wherein the at least one processor device is further operative to:
   obtain an entry from the HTABLE containing the high-order bit for the given branch target.

15. The apparatus of claim 12, wherein the at least one processor device is further operative to:
   input entries from the HTABLE into a multiplexer.

16. The apparatus of claim 12, wherein the branch target T predicted is different from an actual target, and wherein the at least one processor device is further operative to:
   determine whether high-order bits of the actual target equal high-order bits of the branch target T predicted; and
   determine whether low-order bits of the actual target equal low-order bits of the branch target T predicted.

17. The apparatus of claim 16, wherein the high-order bits of the actual target do not equal the high-order bits of the branch target T predicted, and wherein the at least one processor device is further operative to:
   determine whether the high-order bits of the actual target equal high-order bits of the branch address; and
   set the index bits I in the given entry to 0 if the high-order bits of the actual target equal the high-order bits of the branch address.

18. The apparatus of claim 17, wherein the high-order bits of the actual target do not equal the high-order bits of the branch address, and wherein the at least one processor device is further operative to:
   determine if high-order bits of any given entry X in the HTABLE equal the high-order bits of the actual target; and
   set the index bits I in the given entry to an index of the given entry X if the high-order bits of the given entry X in the HTABLE equal the high-order bits of the actual target.

19. The apparatus of claim 16, wherein the low-order bits of the actual target do not equal the low-order bits of the branch target T predicted, and wherein the at least one processor device is further operative to:
   replace the low-order bits of the given branch target in the CTABLE with the low-order bits of the actual target.

20. An article of manufacture for predicting a branch target T in a microprocessor, comprising a non-transitory machine-readable recordable medium containing one or more programs which when executed implement the steps of:
   maintaining a compressed count cache table (CTABLE) of branch targets indexed using a function combining a branch address and a branch history vector for each of the branch targets, wherein entries in the CTABLE contain only low-order bits of each of the branch targets in combination with one or more index bits I;
   obtaining a given one of the entries from the CTABLE related to a given one of the branch targets;
   determining from the index bits I in the given entry whether A) high-order bits of the given branch target are equal to the branch address, or B) the high-order bits of the given branch target are contained in an auxiliary cache table (HTABLE); and
   when A applies: predicting the branch target T using only the low-order bits of the given branch target, or when B applies: accessing the high-order bits of the given branch target via the HTABLE and predicting the branch target T using one or more of the low-order bits of the given branch target and the high-order bits of the given branch target.

* * * * *